United States Patent
Kumar et al.

(10) Patent No.: US 10,482,006 B2
(45) Date of Patent: Nov. 19, 2019

(54) SYSTEM AND METHOD FOR AUTOMATICALLY CATEGORIZING TEST CASES FOR MODEL BASED TESTING

(71) Applicant: Cognizant Technology Solutions India Pvt. Ltd., Chennai (IN)

(72) Inventors: Sanjeev Kumar, Gurgaon (IN); Giripriya Meenakshi Sundaram, Bangalore (IN); Vellore Krishnamurthy Vijayalakshmi, Bangalore (IN); Naveen Kumar, Gaya (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 52 days.

(21) Appl. No.: 15/955,785

(22) Filed: Apr. 18, 2018

(65) Prior Publication Data

US 2018/0365136 A1   Dec. 20, 2018

(30) Foreign Application Priority Data

Jun. 16, 2017   (IN) .............................. 201741021196

(51) Int. Cl.
*G06F 11/36*   (2006.01)
*G06F 17/16*   (2006.01)

(52) U.S. Cl.
CPC ...... *G06F 11/3688* (2013.01); *G06F 11/3684* (2013.01); *G06F 17/16* (2013.01); *G06F 11/3664* (2013.01)

(58) Field of Classification Search
CPC .. G06F 11/3688; G06F 11/3684; G06F 17/16; G06F 11/3664

(Continued)

(56) References Cited

U.S. PATENT DOCUMENTS 9,495,642 B1 * 11/2016 Smith ................... G06F 16/248
2003/0070120 A1 * 4/2003 Michael .............. G06F 11/3664
714/38.14

(Continued)

OTHER PUBLICATIONS

Sapna P.G. et al, "Clustering Test Cases to achieve Effective Test Selection", [Online], 2010, pp. 1-8, [Retrieved from Internet on Jul. 22, 2019], <http://delivery.acm.org/10.1145/1860000/1858393/a15-sapna.pdf> (Year: 2010).*

(Continued)

*Primary Examiner* — Ziaul A Chowdhury
*Assistant Examiner* — Zengpu Wei
(74) *Attorney, Agent, or Firm* — Cantor Colburn LLP

(57) ABSTRACT

A system and computer-implemented method for automatically categorizing test cases is provided. The system comprises a test case importing module configured to receive one or more test cases and a primary grouping module configured to sort the received test cases based on description of the test cases into groups and form a test case array connecting each of the one or more received test cases with a corresponding group number. Furthermore, the system comprises a test step matrix generator configured to receive the one or more test cases and analyze test steps corresponding to each of the one or more received test cases to create a test step matrix. In addition, the system comprises a matrix concatenator configured to concatenate the test case array with the test step matrix and a secondary grouping module configured to generate one or more groups of test cases belonging to one or more categories.

11 Claims, 8 Drawing Sheets

(58) Field of Classification Search
USPC .......................................................... 717/124
See application file for complete search history.

(56) References Cited

U.S. PATENT DOCUMENTS

| | | | |
|---|---|---|---|
| 2006/0206840 A1* | 9/2006 | Iwamura | G06F 17/5022 |
| | | | 716/106 |
| 2010/0287534 A1 | 11/2010 | Vangala | |
| 2012/0042302 A1* | 2/2012 | Sikandar | G06F 11/3688 |
| | | | 717/125 |
| 2015/0242304 A1* | 8/2015 | Akbulut | G06F 3/04842 |
| | | | 714/38.1 |
| 2016/0147646 A1* | 5/2016 | Raghavan | G06F 11/3688 |
| | | | 714/38.1 |
| 2016/0335555 A1* | 11/2016 | Llanes-Tosar | G06F 8/70 |
| 2017/0024310 A1* | 1/2017 | Andrejko | G06F 11/3672 |
| 2017/0046245 A1* | 2/2017 | Liu | G06F 11/368 |
| 2017/0147481 A1* | 5/2017 | Doss | G06F 11/3684 |
| 2017/0199811 A1* | 7/2017 | Narayan | G06F 11/3684 |
| 2017/0293548 A1* | 10/2017 | Kolagatla | G06F 11/3672 |

OTHER PUBLICATIONS

Carlson et al, "A Clustering Approach to Improving Test Case Prioritization: An Industrial Case Study", [Online], 2011, pp. 382-391, [Retrieved from Internet on Jul. 22, 2019], <https://ieeexplore.ieee.org/stamp/stamp.jsp?tp=&arnumber=6080805> (Year: 2010).*
Arafeen et al, "Test Case Prioritization Using Requirements-Based Clustering", [Online], 2013, pp. 1-10, [Retrieved from Inernet on Jul. 22, 2019], <http://www.cse.unt.edu/~hdo/pdf_files/icst13.pdf> (Year: 2013).*
Lilly Raamesh, G.V. Uma; "Knowledge Mining of Test Case System", International Journal on Computer Science and Engineering vol. 2(1), 2009, 69-73, http://www.enggjournals.com/ijcse/doc/IJCSE10-02-01-12.pdf.
Md. Junaid Arafeen, Hyunsook Do; "Test Case Prioritization Using Requirements-Based Clustering", URL: http://cs.ndsu.edu/~hdo/pdf_files/icst13.pdf, Mar. 2013, IEEE International Conference on Software Testing.
Narendra Kumar Rao.B, A.Ramamohan Reddy; "Frequent Segment Clustering of Test cases for Test Suite Reduction", WSEAS Transactions on Computers, vol. 13, 2014, http://www.wseas.org/multimedia/journals/computers/2014/a325705-514.pdf.

* cited by examiner

FIG. 1A

| | |
|---|---|
| TC 1 | 1/3 |
| TC 2 | 1/3 |
| TC 3 | 2/3 |
| TC 4 | 3/3 |

Table 1: Sample Test Case Array

| | A | B | C | D |
|---|---|---|---|---|
| TC 1 | 1 | 0 | 3 | 4 |
| TC 2 | 1 | 0 | 0 | 5 |
| TC 3 | 1 | 1 | 1 | 1 |
| TC 4 | 1 | 3 | 2 | 1 |

Table 2: Sample Normalized Test Step Matrix

| | A | B | C | D | |
|---|---|---|---|---|---|
| TC 1 | 1 | 0 | 3 | 4 | 1/3 |
| TC 2 | 1 | 0 | 0 | 5 | 1/3 |
| TC 3 | 1 | 1 | 1 | 1 | 2/3 |
| TC 4 | 1 | 3 | 2 | 1 | 3/3 |

Table 3: Concatenated Matrix

SYSTEM AND METHOD FOR AUTOMATICALLY CATEGORIZING TEST CASES FOR MODEL BASED TESTING

CROSS REFERENCE TO RELATED APPLICATION

This application is related to and claims the benefit of Indian Patent Application Number 201741021196 filed on Jun. 16, 2017, the contents of which are herein incorporated by reference in their entirety.

FIELD OF THE INVENTION

The present invention relates generally to model based testing. More particularly, the present invention provides a system and method for automatically categorizing test cases for model based testing.

BACKGROUND OF THE INVENTION

Model-based testing is a software testing technique in which test cases are derived from a model that describes the functional aspects of system under test. The testing requirements are understood by the testers and converted to business models. The business models are then used for automatically generating the test cases. Model-based testing is efficient and in case of any changes facilitates in automatically identifying impacted test cases. Many enterprises nowadays are willing to adopt model-based testing as it eliminates the need for manual test design. Further, some of their products are in maintenance phase and therefore already have numerous existing test cases. The enterprises need to categorize the existing test cases based on their functionalities for model-based testing.

Conventionally, various systems and methods exist for categorizing test cases for model based testing. For example, the enterprises manually categorize the test cases and group them based on similar functionalities. However, manually categorizing the test cases requires a lot of time and effort. Further, manually categorizing the test cases is costly, prone to errors and inefficient. Enterprises are hesitant to move to model-based testing technique due to the aforesaid reasons.

In light of the abovementioned disadvantages, there is a need for a system and method for automatically categorizing test cases for model based testing. Further, there is a need for a system and method that analyzes the existing test cases and create groups of similar test cases. Furthermore, there is a need for a system and method that is capable of analyzing and subgrouping the created groups. In addition, there is a need for a system and method that facilitates in naming the created groups and subgroups. Also, there is a need for an efficient and inexpensive system and method that facilitates in optimally categorizing the test cases with minimal human intervention.

SUMMARY OF THE INVENTION

A system, computer-implemented method and computer program product for automatically categorizing test cases is provided. The system comprises a test case importing module configured to receive one or more test cases. The system further comprises a primary grouping module configured to sort the one or more received test cases based on description of the one or more test cases into one or more groups and form a test case array connecting each of the one or more received test cases with a corresponding group number. Furthermore, the system comprises a test step matrix generator in communication with the test case importing module configured to receive the one or more test cases; and analyze test steps corresponding to each of the one or more received test cases to create a test step matrix. In addition, the system comprises a matrix concatenator configured to concatenate the test case array with the test step matrix to generate a concatenated matrix. The system also comprises a secondary grouping module configured to group the one or more received test cases by using the concatenated matrix and applying silhouette method and K-means algorithm to generate one or more groups of test cases belonging to one or more categories.

In an embodiment of the present invention, the one or more test cases are received from one or more test management systems and one or more test case repositories. In an embodiment of the present invention, the one or more test cases are received by importing one or more files containing information comprising test case identification number, test case description and test step description. Further, the one or more files have one or more formats comprising a spreadsheet format, a document format and an EXtensible Markup Language (XML) format.

In an embodiment of the present invention, the system further comprises a subgrouping module configured to create one or more subgroups of the generated one or more groups of test cases based on a preconfigured threshold value. In an embodiment of the present invention, the system further comprises a naming module configured to assign names to the one or more generated groups of test cases and the one or more created subgroups.

The computer-implemented method for automatically categorizing test cases, via program instructions stored in a memory and executed by a processor, comprises receiving and sorting one or more test cases based on description of the one or more test cases into one or more groups and forming a test case array connecting each of the one or more test cases with a corresponding group number. The computer-implemented method further comprises analyzing test steps corresponding to each of the one or more received test cases to create a test step matrix. Furthermore, the computer-implemented method comprises concatenating the test case array with the test step matrix to generate a concatenated matrix. The computer-implemented method also comprises grouping the one or more received test cases by using the concatenated matrix and applying silhouette method and K-means algorithm to generate one or more groups of test cases belonging to one or more categories.

The computer program product for automatically categorizing test cases, the computer program product comprising a non-transitory computer-readable medium having computer-readable program code stored thereon, the computer-readable program code comprising instructions that when executed by a processor, cause the processor to receive and sort one or more test cases based on description of the one or more test cases into one or more groups and forming a test case array connecting each of the one or more test cases with a corresponding group number. The processor further analyzes test steps corresponding to each of the one or more received test cases to create a test step matrix. Furthermore, the processor concatenates the test case array with the test step matrix to generate a concatenated matrix. Also, the processor groups the one or more received test cases by using the concatenated matrix and applying silhouette method and K-means algorithm to generate one or more groups of test cases belonging to one or more categories.

BRIEF DESCRIPTION OF THE ACCOMPANYING DRAWINGS

The present invention is described by way of embodiments illustrated in the accompanying drawings wherein:

FIG. 1A is a table illustrating a test step matrix, in accordance with an exemplary embodiment of the present invention;

FIG. 1B illustrates tables representing a sample test case array, a sample normalized test step matrix and a sample concatenated matrix, in accordance with an exemplary embodiment of the present invention;

FIG. 2A is a screenshot illustrating importation of one or more test cases, in accordance with an exemplary embodiment of the present invention;

DETAILED DESCRIPTION OF THE INVENTION

A system and method for automatically categorizing test cases for model based testing is described herein. The invention provides for a system and method that analyzes the existing test cases and create groups of similar test cases based on the analysis. Further, the invention provides for a system and method capable of analyzing and subgrouping the created groups. Furthermore, the invention provides for a system and method that facilitates in automatically naming the created groups and subgroups. Also, the invention provides for an efficient and inexpensive system and method that facilitates in optimally categorizing the test cases with minimal human intervention.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
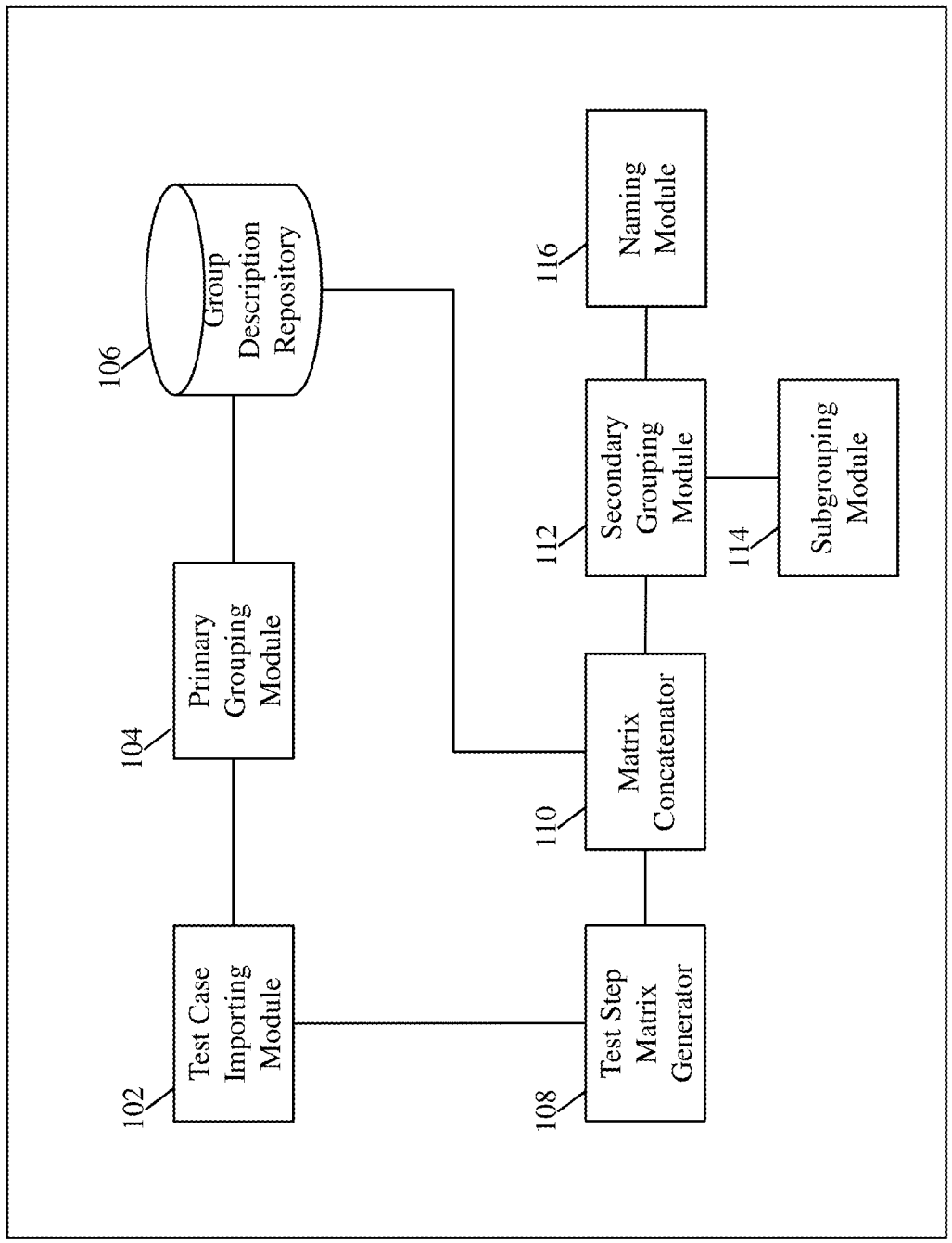
FIG. 1 is a block diagram illustrating a system for automatically categorizing test cases for model based testing, in accordance with an embodiment of the present invention.

FIG. 1 is a block diagram illustrating a system 100 for automatically categorizing test cases for model based testing, in accordance with an embodiment of the present invention. The system 100 comprises a test case importing module 102, a primary grouping module 104, a group description repository 106, a test step matrix 108, a matrix concatenator 110, a secondary grouping module 112, a subgrouping module 114 and a naming module 116.

The test case importing module 102 is configured to receive one or more test cases. In an embodiment of the present invention, the one or more test cases are received from various sources such as, but not limited to, one or more test management systems and one or more test case repositories. The one or more test case repositories comprise manually prepared test cases. In an embodiment of the present invention, the one or more test cases are received by importing one or more files containing information such as, but not limited to, test case ID/number, test case description and test step description. The one or more files have various formats such as, but not limited to, a spreadsheet format, a document format and an EXtensible Markup Language (XML) format. In an exemplary embodiment of the present invention, one or more excel files containing test case ID, test case description, test step description and expected result are received.

In an exemplary embodiment of the present invention, the following 15 Automatic Teller Machine (ATM) test cases are received from an excel file. The example provided below has 15 ATM test cases only for illustrating the invention. The invention may be implemented for grouping any number of test cases.

| Test Case ID | Test Case Description | Test Step No. | Test Step Description | Expected Result |
|---|---|---|---|---|
| Scenario 1 | ATM Withdrawal of money | 1 | User should be able to select the withdraw money option | User is able to select the withdraw money option |
| | | 2 | User should be able to select the account type | User is able to slect the account type |
| | | 3 | Usersould be able to sleect the current account to withdraw money | User is able to sleect the current account to withdraw money |
| | | 4 | User can choose to either: withdraw by enetering specific amount, withdraw by selecting fast cash or | User is able to choose to either: withdraw by enetering specific |

| Test Case ID | Test Case Description | Test Step No. | Test Step Description | Expected Result |
|---|---|---|---|---|
| | | | can choose to cancel the transaction | amount, withdraw by selecting fast cash or can choose to cancel the transaction |
| | | 5 | User should be able to enter the amount to be withdrawn | User is able to enter the amount to be withdrawn |
| | | 6 | User confirms the amount and proceeds for withdrawl | User is able to proceeds for withdrawl |
| Scenario 2 | ATM Withdrawal of money | 1 | User should be able to select the withdraw money option | User is able to select the withdraw money option |
| | | 2 | User should be able to select the account type | User is able to slect the account type |
| | | 3 | Usersould be able to sleect the current account to withdraw money | User is able to sleect the current account to withdraw money |
| | | 4 | User can choose to either: withdraw by enetering specific amount, withdraw by selecting fast cash or can choose to cancel the transaction | User is able to choose to either: withdraw by enetering specific amount, withdraw by selecting fast cash or can choose to cancel the transaction |
| | | 5 | User should be able to select the fast cash option | User is able to select the fast cash option |
| | | 6 | User should be able to directly select the fast cash option of 5000, 10000, 15000 | User is able to directly select the fast cash option of 5000, 10000, 15000 |
| | | 7 | User confirms the amount and proceeds for withdrawl | User is able to proceeds for withdrawl |
| Scenario 3 | ATM Withdrawal of money | 1 | User should be able to select the withdraw money option | User is able to select the withdraw money option |
| | | 2 | User should be able to select the account type | User is able to slect the account type |
| | | 3 | User should be able to sleect the Reccuringaccount to withdraw money | User is able to slect the Recurring account to withdraw money |
| | | 4 | User can choose to either: withdraw by enetering specific amount, withdraw by selecting fast cash or can choose to cancel the transaction | User is able to choose to either: withdraw by enetering specific amount, withdraw by selecting fast cash or can choose to cancel the transaction |
| | | 5 | User should be able to enter the amount to be withdrawn | User is able to enter the amount to be withdrawn |
| | | 6 | User confirms the amount and proceeds for withdrawl | User is able to proceeds for withdrawl |
| Scenario 4 | ATM Withdrawal of money | 1 | User should be able to select the withdraw money option | User is able to select the withdraw money option |
| | | 2 | User should be able to select the account type | User is able to slect the account type |
| | | 3 | User should be able to sleect the Reccuringaccount to withdraw money | User is able to slect the Recurring account to withdraw money |
| | | 4 | User can choose to either: withdraw by enetering specific amount, withdraw by selecting fast cash or can choose to cancel the transaction | User is able to choose to either: withdraw by enetering specific amount, withdraw by selecting fast cash or can choose to cancel the transaction |

-continued

| Test Case ID | Test Case Description | Test Step No. | Test Step Description | Expected Result |
|---|---|---|---|---|
| | | 5 | User should be able to select the fast cash option | User is able to select the fast cash option |
| | | 6 | User should be able to directly select the fast cash option of 5000, 10000, 15000 | User is able to directly select the fast cash option of 5000, 10000, 15000 |
| | | 7 | User confirms the amount and proceeds for withdrawl | User is able to proceeds for withdrawl |
| Scenario 5 | ATM Withdrawal of money | 1 | User should be able to select the withdraw money option | User is able to select the withdraw money option |
| | | 2 | User should be able to select the account type | User is able to sleet the account type |
| | | 3 | User is able to sleect the savings account to withdraw money | User is able to sleect the savings account to withdraw money |
| | | 4 | User can choose to either: withdraw by enetering specific amount, withdraw by selecting fast cash or can choose to cancel the transaction | User is able to choose to either: withdraw by enetering specific amount, withdraw by selecting fast cash or can choose to cancel the transaction |
| | | 5 | User should be able to enter the amount to be withdrawn | User is able to enter the amount to be withdrawn |
| | | 6 | User confirms the amount and proceeds for withdrawl | User is able to proceeds for withdrawl |
| Scenario 6 | ATM Withdrawal of money | 1 | User should be able to select the withdraw money option | User is able to select the withdraw money option |
| | | 2 | User should be able to select the account type | User is able to slect the account type |
| | | 3 | User is able to sleect the savings account to withdraw money | User is able to sleect the savings account to withdraw money |
| | | 4 | User can choose to either: withdraw by enetering specific amount, withdraw by selecting fast cash or can choose to cancel the transaction | User is able to choose to either: withdraw by enetering specific amount, withdraw by selecting fast cash or can choose to cancel the transaction |
| | | 5 | User should be able to select the fast cash option | User is able to select the fast cash option |
| | | 6 | User should be able to directly select the fast cash option of 5000, 10000, 15000 | User is able to directly select the fast cash option of 5000, 10000, 15000 |
| | | 7 | User confirms the amount and proceeds for withdrawl | User is able to proceeds for withdrawl |
| Scenario 7 | ATM Withdrawal of money | 1 | User should be able to select the withdraw money option | User is able to select the withdraw money option |
| | | 2 | User should be able to select the account type | User is able to slect the account type |
| | | 3 | Usersould be able to sleect the current account to withdraw money | User is able to sleect the current account to withdraw money |
| | | 4 | User can choose to either: withdraw by enetering specific amount, withdraw by selecting fast cash or can choose to cancel the transaction | User is able to choose to either: withdraw by enetering specific amount, withdraw by selecting fast cash or can choose to cancel the transaction |
| | | 5 | User should be able to select the cancel option and abort the transaction | User is able to select the cancel option and abort the transaction |

-continued

| Test Case ID | Test Case Description | Test Step No. | Test Step Description | Expected Result |
|---|---|---|---|---|
| Scenario 8 | ATM Withdrawal of money | 1 | User should be able to select the withdraw money option | User is able to select the withdraw money option |
| | | 2 | User should be able to select the account type | User is able to slect the account type |
| | | 3 | User should be able to sleect the Reccuringaccount to withdraw money | User is able to slect the Recurring account to withdraw money |
| | | 4 | User can choose to either: withdraw by enetering specific amount, withdraw by selecting fast cash or can choose to cancel the transaction | User is able to choose to either: withdraw by enetering specific amount, withdraw by selecting fast cash or can choose to cancel the transaction |
| | | 5 | User should be able to select the cancel option and abort the transaction | User is able to select the cancel option and abort the transaction |
| Scenario 9 | ATM Withdrawal of money | 1 | User should be able to select the withdraw money option | User is able to select the withdraw money option |
| | | 2 | User should be able to select the account type | User is able to slect the account type |
| | | 3 | User is able to sleect the savings account to withdraw money | User is able to sleect the savings account to withdraw money |
| | | 4 | User can choose to either: withdraw by enetering specific amount, withdraw by selecting fast cash or can choose to cancel the transaction | User is able to choose to either: withdraw by enetering specific amount, withdraw by selecting fast cash or can choose to cancel the transaction |
| | | 5 | User should be able to select the cancel option and abort the transaction | User is able to select the cancel option and abort the transaction |
| Scenario 10 | Change ATM Pin | 1 | User should be able to change the ATM pin number | User is able to change the ATM pin number |
| | | 2 | System should prompt the user to enter the current ATM pin number | System prompts the user to enter the current ATM pin number |
| | | 3 | Sytem should allow the user to enter the new pin number | Sytem allows the user to enter the new pin number |
| | | 4 | User should be able to cancel the transaction | User is able to cancel the transaction |
| Scenario 11 | Change ATM Pin | 1 | User should be able to change the ATM pin number | User is able to change the ATM pin number |
| | | 2 | System should prompt the user to enter the current ATM pin number | System prompts the user to enter the current ATM pin number |
| | | 3 | Sytem should allow the user to enter the new pin number | Sytem allows the user to enter the new pin number |
| | | 4 | User should be able to confirm the new pin and proceed | User is able to confirm and proceed |
| Scenario 12 | Change ATM Pin | 1 | User should be able to change the ATM pin number | User is able to change the ATM pin number |
| | | 2 | System should prompt the user to enter the current ATM pin number | System prompts the user to enter the current ATM pin number |
| | | 3 | Sytem should allow the user to enter the new pin number | Sytem allows the user to enter the new pin number |

-continued

| Test Case ID | Test Case Description | Test Step No. | Test Step Description | Expected Result |
|---|---|---|---|---|
| Scenario 13 | ATM Balace Enquiry | 1 | User should be able to select the enquire balance option | User is able to select the enquire balance option |
| | | 2 | User should be able to select the acount type | User is able to select account type |
| | | 3 | User should be able to select recurring account and enquire for balance | User is able to select recurring account and enquire for balancee |
| | | 4 | sample | |
| | | 5 | The system should dispaly the balance | The system displays the balance |
| Scenario 14 | ATM Balace Enquiry | 1 | User should be able to select the enquire balance option | User is able to select the enquire balance option |
| | | 2 | User should be able to select the acount type | User is able to select account type |
| | | 3 | User should be able to select current account and enquire for balance | User is able to select current account and enquire for balance |
| | | 4 | The system should dispaly the balance | The system displays the balance |
| Scenario 15 | ATM Balace Enquiry | 1 | User should be able to select the enquire balance option | User is able to select the enquire balance option |
| | | 2 | User should be able to select the acount type | User is able to select account type |
| | | 3 | User should be able to select savings account and enquire for balance | User is able to select savings account and enquire for balance |
| | | 4 | The system should dispaly the balance | The system displays the balance |

The primary grouping module 104 is configured to sort the test cases based on their description. In an exemplary embodiment of the present invention, the one or more test cases whose description is 70% same are sorted into one group. Furthermore, the sorted groups are then assigned group numbers. In an exemplary embodiment of the present invention, the sorted groups are assigned numbers in ascending order starting from 1. Once the one or more test cases are grouped, the primary grouping module 104 forms an array connecting each test case with corresponding group number. The primary grouping module then divides each group number by the maximum number of groups. In an exemplary embodiment of the present invention, the remaining test cases that are not grouped are considered as orphan test cases and accumulated in a separate group referred to as an orphan group. The data generated by the primary grouping module 104 is stored in the group description repository 106.

Referring back to the exemplary embodiment mentioned above, the 15 ATM test cases are sorted based on their description and the groups are numbered as illustrated in the tables below.

| Group Number | Test Case Count |
|---|---|
| 1 | 9 |
| 2 | 3 |
| 3 | 3 |

The test step matrix generator 108 is configured to receive the one or more test cases from the test case importing module 102 and process the test steps corresponding to each of the one or more received test cases to create a test step matrix. For creating the test step matrix, the test step matrix generator 108 calculates weightage of each word in the test step using the following formula:

$$\log(\text{Term frequency}) * \log\left(\frac{\text{Total Number of test cases}}{\text{Test case Frequency}}\right)$$

wherein, term frequency is number of times a particular term/word occurs in test steps of all test cases and test case frequency is number of test cases that a particular term/word is occurring. The test step matrix generator 108 then calculates threshold weightage using the following formula:

Threshold=Mean+Standard deviation (weightages)

Figure 1A:
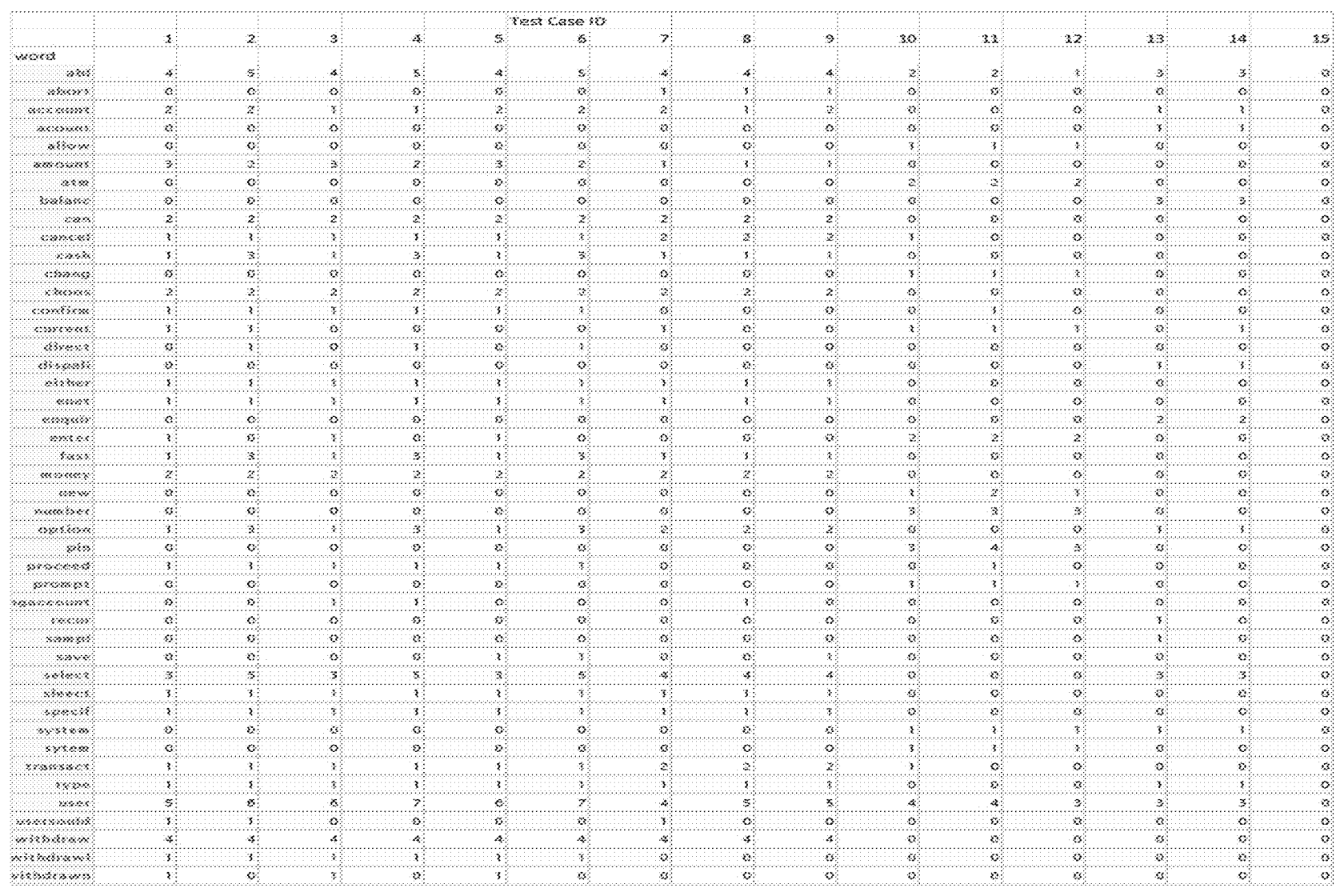

Referring back to the embodiment mentioned above, FIG. 1A is a table illustrating a test step matrix, in accordance with an exemplary embodiment of the present invention. The test step matrix illustrated in the FIG. 1A represents occurrence of each word with respect to each of the 15 ATM test cases.

The frequency/occurrence of words with respect to all the test cases is also calculated using the test step matrix as illustrated in table below.

| S No. | Word | Frequency |
|---|---|---|
| 1 | Abl | 50 |
| 2 | Abort | 3 |
| 3 | Account | 17 |
| 4 | Account | 2 |
| 5 | Allow | 3 |
| 6 | Amount | 18 |
| 7 | Atm | 6 |

-continued

| S No. | Word | Frequency |
|---|---|---|
| 8 | Balance | 6 |
| 9 | Can | 18 |
| 10 | Cancel | 13 |
| 11 | Cash | 15 |
| 12 | Chang | 3 |
| 13 | Choos | 18 |
| 14 | Confirm | 7 |
| 15 | Current | 7 |
| 16 | Direct | 3 |
| 17 | dispali | 2 |
| 18 | Either | 9 |
| 19 | Enet | 9 |
| 20 | Enquir | 4 |
| 21 | Enter | 9 |
| 22 | Fast | 15 |
| 23 | Money | 18 |
| 24 | New | 4 |
| 25 | Number | 9 |
| 26 | Option | 20 |
| 27 | Pin | 10 |
| 28 | Proceed | 7 |
| 29 | prompt | 3 |
| 30 | reccuringaccount | 3 |
| 31 | recur | 1 |
| 32 | sampl | 1 |
| 33 | Save | 3 |
| 34 | select | 42 |
| 35 | sleect | 9 |
| 36 | specif | 9 |
| 37 | system | 5 |
| 38 | Sytem | 3 |
| 39 | transact | 13 |
| 40 | Type | 11 |
| 41 | User | 68 |
| 42 | usersould | 3 |
| 43 | withdraw | 36 |
| 44 | withdrawl | 6 |
| 45 | withdrawn | 3 |

Further, term frequency which is Log 10 of number of times a particular term/word occurs in test steps of all the test cases is computed as illustrated in the table below.

| Serial No. | Word | Log10(Frequency of each word) |
|---|---|---|
| 1 | Abl | 1.6989700 |
| 2 | Abort | 0.4771213 |
| 3 | account | 1.2304489 |
| 4 | acount | 0.3010300 |
| 5 | Allow | 0.4771213 |
| 6 | amount | 1.2552725 |
| 7 | Atm | 0.7781513 |
| 8 | balanc | 0.7781513 |
| 9 | Can | 1.2552725 |
| 10 | cancel | 1.1139434 |
| 11 | Cash | 1.1760913 |
| 12 | Chang | 0.4771213 |
| 13 | Choos | 1.2552725 |
| 14 | confirm | 0.8450980 |
| 15 | current | 0.8450980 |
| 16 | direct | 0.4771213 |
| 17 | dispali | 0.3010300 |
| 18 | either | 0.9542425 |
| 19 | Enet | 0.9542425 |
| 20 | enquir | 0.6020600 |
| 21 | enter | 0.9542425 |
| 22 | Fast | 1.1760913 |
| 23 | money | 1.2552725 |
| 24 | New | 0.6020600 |
| 25 | number | 0.9542425 |
| 26 | option | 1.3010300 |
| 27 | Pin | 1.0000000 |
| 28 | proceed | 0.8450980 |
| 29 | prompt | 0.4771213 |
| 30 | reccuringaccount | 0.4771213 |

-continued

| Serial No. | Word | Log10(Frequency of each word) |
|---|---|---|
| 31 | recur | 0.0000000 |
| 32 | sampl | 0.0000000 |
| 33 | Save | 0.4771213 |
| 34 | select | 1.6232493 |
| 35 | sleect | 0.9542425 |
| 36 | specif | 0.9542425 |
| 37 | system | 0.6989700 |
| 38 | Sytem | 0.4771213 |
| 39 | transact | 1.1139434 |
| 40 | Type | 1.0413927 |
| 41 | User | 1.8325089 |
| 42 | usersould | 0.4771213 |
| 43 | withdraw | 1.5563025 |
| 44 | withdrawl | 0.7781513 |
| 45 | withdrawn | 0.4771213 |

The test case frequency is calculated using the test step matrix, wherein the test case frequency is number of test cases that a particular term/word has occurred.

| Serial No. | Word | Frequency of word with respect to test cases |
|---|---|---|
| 1 | abl | 14 |
| 2 | abort | 3 |
| 3 | account | 11 |
| 4 | acount | 2 |
| 5 | allow | 3 |
| 6 | amount | 9 |
| 7 | atm | 3 |
| 8 | balanc | 2 |
| 9 | can | 9 |
| 10 | cancel | 10 |
| 11 | cash | 9 |
| 12 | chang | 3 |
| 13 | choos | 9 |
| 14 | confirm | 7 |
| 15 | current | 7 |
| 16 | direct | 3 |
| 17 | dispali | 2 |
| 18 | either | 9 |
| 19 | enet | 9 |
| 20 | enquir | 2 |
| 21 | enter | 6 |
| 22 | fast | 9 |
| 23 | money | 9 |
| 24 | new | 3 |
| 25 | number | 3 |
| 26 | option | 11 |
| 27 | pin | 3 |
| 28 | proceed | 7 |
| 29 | prompt | 3 |
| 30 | reccuringaccount | 3 |
| 31 | recur | 1 |
| 32 | sampl | 1 |
| 33 | save | 3 |
| 34 | select | 11 |
| 35 | sleect | 9 |
| 36 | specif | 9 |
| 37 | system | 5 |
| 38 | sytem | 3 |
| 39 | transact | 10 |
| 40 | type | 14 |
| 41 | user | 3 |
| 42 | usersould | 9 |
| 43 | withdraw | 9 |
| 44 | withdrawl | 6 |
| 45 | withdrawn | 3 |

The log 10 (Number of Test Cases/Test Case Frequency) for each word is then computed as illustrated in the table below with respect to the exemplary 15 test cases.

| Serial No. | Word | Log10(No. of TC/TC frequency) |
|---|---|---|
| 1 | abl | 0.02996322 |
| 2 | abort | 0.69897000 |
| 3 | account | 0.13469857 |
| 4 | acount | 0.87506126 |
| 5 | allow | 0.69897000 |
| 6 | amount | 0.22184875 |
| 7 | atm | 0.69897000 |
| 8 | balanc | 0.87506126 |
| 9 | can | 0.22184875 |
| 10 | cancel | 0.17609126 |
| 11 | cash | 0.22184875 |
| 12 | chang | 0.69897000 |
| 13 | choos | 0.22184875 |
| 14 | confirm | 0.33099322 |
| 15 | current | 0.33099322 |
| 16 | direct | 0.69897000 |
| 17 | dispali | 0.87506126 |
| 18 | either | 0.22184875 |
| 19 | enet | 0.22184875 |
| 20 | enquir | 0.87506126 |
| 21 | enter | 0.39794001 |
| 22 | fast | 0.22184875 |
| 23 | money | 0.22184875 |
| 24 | new | 0.69897000 |
| 25 | number | 0.69897000 |
| 26 | option | 0.13469857 |
| 27 | pin | 0.69897000 |
| 28 | proceed | 0.33099322 |
| 29 | prompt | 0.69897000 |
| 30 | reccuringaccount | 0.69897000 |
| 31 | recur | 1.17609126 |
| 32 | sampl | 1.17609126 |
| 33 | save | 0.69897000 |
| 34 | select | 0.13469857 |
| 35 | sleect | 0.22184875 |
| 36 | specif | 0.22184875 |
| 37 | system | 0.47712125 |
| 38 | sytem | 0.69897000 |
| 39 | transact | 0.17609126 |
| 40 | type | 0.13469857 |
| 41 | user | 0.02996322 |
| 42 | usersould | 0.69897000 |
| 43 | withdraw | 0.22184875 |
| 44 | withdrawl | 0.39794001 |
| 45 | withdrawn | 0.69897000 |

The weightage of each word is then calculated using the below formula.

$$\log(\text{Term frequency}) * \log\left(\frac{\text{Total Number of test cases}}{\text{Test case Frequency}}\right)$$

| Serial No. | Word | Weightage of Word |
|---|---|---|
| 1 | abl | 0.05090662 |
| 2 | abort | 0.33349345 |
| 3 | account | 0.16573971 |
| 4 | acount | 0.26341969 |
| 5 | allow | 0.33349345 |
| 6 | amount | 0.27848064 |
| 7 | atm | 0.54390438 |
| 8 | balanc | 0.68093002 |
| 9 | can | 0.27848064 |
| 10 | cancel | 0.19615569 |
| 11 | cash | 0.26091438 |
| 12 | chang | 0.33349345 |
| 13 | choos | 0.27848064 |
| 14 | confirm | 0.27972172 |
| 15 | current | 0.27972172 |
| 16 | direct | 0.33349345 |
| 17 | dispali | 0.26341969 |
| 18 | either | 0.21169751 |
| 19 | enet | 0.21169751 |
| 20 | enquir | 0.52683938 |
| 21 | enter | 0.37973127 |
| 22 | fast | 0.26091438 |
| 23 | money | 0.27848064 |
| 24 | new | 0.42082187 |
| 25 | number | 0.66698689 |
| 26 | option | 0.17524689 |
| 27 | pin | 0.69897000 |
| 28 | proceed | 0.27972172 |
| 29 | prompt | 0.33349345 |
| 30 | reccuringaccount | 0.33349345 |
| 31 | recur | 0.00000000 |
| 32 | sampl | 0.00000000 |
| 33 | save | 0.33349345 |
| 34 | select | 0.21864936 |
| 35 | sleect | 0.21169751 |
| 36 | specif | 0.21169751 |
| 37 | system | 0.33349345 |
| 38 | sytem | 0.33349345 |
| 39 | transact | 0.19615569 |
| 40 | type | 0.14027411 |
| 41 | user | 0.05490787 |
| 42 | usersould | 0.33349345 |
| 43 | withdraw | 0.34526376 |
| 44 | withdrawl | 0.30965752 |
| 45 | withdrawn | 0.33349345 |

The weightage of words are then sorted in a decreasing order based on the calculated weight as illustrated.

| Word No. | Word | Weightage |
|---|---|---|
| 27 | Pin | 0.69897 |
| 8 | Balance | 0.68093002 |
| 25 | number | 0.66698689 |
| 7 | Atm | 0.54390438 |
| 20 | Enquir | 0.52683938 |
| 24 | New | 0.42082187 |
| 21 | enter | 0.37973127 |
| 43 | withdraw | 0.34526376 |
| 2 | abort | 0.33349345 |
| 5 | allow | 0.33349345 |
| 12 | chang | 0.33349345 |
| 16 | direct | 0.33349345 |
| 29 | prompt | 0.33349345 |
| 30 | reccuringaccount | 0.33349345 |
| 33 | Save | 0.33349345 |
| 37 | system | 0.33349345 |
| 38 | sytem | 0.33349345 |
| 42 | usersould | 0.33349345 |
| 45 | withdrawn | 0.33349345 |
| 44 | withdrawl | 0.30965752 |
| 14 | confirm | 0.27972172 |
| 15 | current | 0.27972172 |
| 28 | proceed | 0.27972172 |
| 6 | amount | 0.27848064 |
| 9 | Can | 0.27848064 |
| 13 | choos | 0.27848064 |
| 23 | money | 0.27848064 |
| 4 | acount | 0.26341969 |
| 17 | dispali | 0.26341969 |
| 11 | cash | 0.26091438 |
| 22 | Fast | 0.26091438 |
| 34 | select | 0.21864936 |
| 18 | either | 0.21169751 |
| 19 | enet | 0.21169751 |
| 35 | sleect | 0.21169751 |
| 36 | specif | 0.21169751 |
| 10 | cancel | 0.19615569 |
| 39 | transact | 0.19615569 |
| 26 | option | 0.17524689 |
| 3 | account | 0.16573971 |
| 40 | Type | 0.14027411 |
| 41 | User | 0.05490787 |

| Word No. | Word | Weightage |
|---|---|---|
| 1 | Abl | 0.05090662 |
| 31 | recur | 0 |
| 32 | sampl | 0 |

The mean frequency and standard deviation is then computed. Referring to the example above, the computed mean frequency is 0.2952914 and the computed standard deviation is 0.1517893. Further, the threshold is computed as sum of the mean frequency and the standard deviation.

Threshold=Mean Frequency+Standard Deviation
0.4470808=0.2952914+0.1517893

The required words for grouping of test description is filtered based on the condition that the weightage of the word is greater than the threshold value i.e. 0.4470808.

In an exemplary embodiment of the present invention, if a test case does not contain any of the selected words (referred to as uncaptured test case), then test step matrix generator 108 considers the next word with immediate less than threshold and adds it to the selected list of words and updates the word matrix. This process is repeated until uncaptured test case count becomes zero. Further, the above-mentioned process is executed in order to make sure that all the test cases are captured and involved in the grouping.

The test step matrix generator 108 repeats the above steps until all test cases are represented in the test step matrix. Further, the rows of the created test step matrix are then normalized.

The matrix concatenator 110 is configured to concatenate the test case array stored in the group description repository 106 with the normalized test step matrix to generate a concatenated matrix. FIG. 1B illustrate tables representing a sample test case array, a sample normalized test step matrix and a sample concatenated matrix, in accordance with an exemplary embodiment of the present invention.

Referring to the example of 15 ATM test cases, the sample test case array corresponding to the 15 ATM test cases is provided in the table below.

| Test Case No. | Group No./3 |
|---|---|
| TC 1 | 0.3333 |
| TC 2 | 0.3333 |
| TC 3 | 0.3333 |
| TC 4 | 0.3333 |
| TC 5 | 0.3333 |
| TC 6 | 0.3333 |
| TC 7 | 0.3333 |
| TC 8 | 0.3333 |
| TC 9 | 0.3333 |
| TC 10 | 0.6666 |
| TC 11 | 0.6666 |
| TC 12 | 0.6666 |
| TC 13 | 1 |
| TC 14 | 1 |
| TC 15 | 1 |

The sample concatenated matrix with respect to the 15 ATM test cases is provided below.

| Word Matrix | Pin | Balance | Number | Atm --------Abl | recur | sampl | TC Group Weightage |
|---|---|---|---|---|---|---|---|
| TC 1 | 0 | 0 | 0 | Weightages of all | 0 | 0 | 0.333333 |
| TC 2 | 0 | 0 | 0 | the other words | 0 | 0 | 0.333333 |
| TC 3 | 0 | 0 | 0 | i.e. Atm, Enquir, | 0 | 0 | 0.333333 |
| TC 4 | 0 | 0 | 0 | New, enter, | 0 | 0 | 0.333333 |
| TC 5 | 0 | 0 | 0 | withdraw, abort, | 0 | 0 | 0.333333 |
| TC 6 | 0 | 0 | 0 | allow, chang, | 0 | 0 | 0.333333 |
| TC 7 | 0 | 0 | 0 | direct, prompt, | 0 | 0 | 0.333333 |
| TC 8 | 0 | 0 | 0 | reccuringaccount, | 0 | 0 | 0.333333 |
| TC 9 | 0 | 0 | 0 | Save, system, | 0 | 0 | 0.333333 |
| TC 10 | 0.40452 | 0 | 0.40452 | sytem, usersould, | 0 | 0 | 0.666667 |
| TC 11 | 0.496139 | 0 | 0.372104 | withdrawn, | 0 | 0 | 0.666667 |
| TC 12 | 0.457496 | 0 | 0.457496 | withdrawl, | 0 | 0 | 0.666667 |
| TC 13 | 0 | 0.433013 | 0 | confirm, current, | 0.144338 | 0.144338 | 1 |
| TC 14 | 0 | 0.437595 | 0 | proceed, amount, | 0 | 0 | 1 |
| TC 15 | 0 | 0 | 0 | Can, choos, money, account, dispali, cash, Fast, select, either, enet, sleect, specif, cancel, transact, option, account, Type, User, Abl | 0 | 0 | 1 |

The secondary grouping module 112 is configured to group the received one or more test cases using Silhouette method. The secondary grouping module fixes value of a parameter referred to as division factor. The total number of test cases are divided by the division factor and rounded to the greatest integer (referred to as G hereinafter). The secondary grouping module 112 then checks for the best approximate group in G+5 and G−5 groups using the silhouette method. Thereafter, the secondary grouping module 112 selects a test case from the first row of the concatenated matrix. The secondary grouping module 112 then identifies a point as a centroid which is farthest from the closest centroid. The above steps are repeated until all centroids are identified and whose number is equal to number of groups. K-means algorithm is then applied to the corresponding centroids on the concatenated matrix to create various groups of test cases.

In an exemplary embodiment of the present invention, for a predetermined number of test cases, the division factor is also pre-defined, for example as depicted in table below:

| No. of test cases (tc) | Division Factor |
|---|---|
| Test cases <= 500 | 20 |
| 500 < test cases <= 1000 | 40 |
| Test cases > 1000 | 60 |

In an exemplary embodiment of the present invention, if number of Test Cases (TC) is 52, then initial number of groups are G=52/20=2.6, which is rounded to the next number, therefore G=3. Once the initial number of groups is obtained, silhouette analysis is performed, to obtain the appropriate number of groups.

Referring to the exemplary embodiment of 15 ATM test cases discussed above, value of G is 15/20=1. The range for number of clusters is G−5 to G+5, therefore the number of clusters should be between 0 to 6 (negative values are not considered for grouping). On application of Silhouette analysis Number of groups is determined to be 4.

Figure 1C:
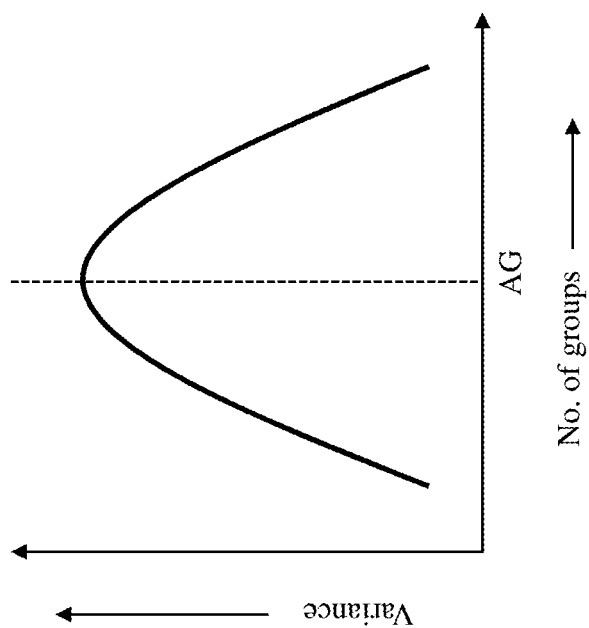
FIG. 1C is a graph illustrating silhouette analysis, in accordance with an exemplary embodiment of the present invention.

FIG. 1C is a graph illustrating silhouette analysis, in accordance with an exemplary embodiment of the present invention. Appropriate number of groups (referred to as AG in the FIG. 1C) is determined using silhouette method. In an embodiment of the present invention, first centroid is considered as the test case from the first row of the concatenated matrix. Further, second centroid is the farthest from the first centroid. Furthermore, rest of the centroids are identified by considering a point which is farthest from the closest centroid.

Referring to the exemplary embodiment discussed above, on application of the K-means Algorithm, the final grouping of the test cases is provided below.

| Test case ID | Group No. |
|---|---|
| 1 | 1 |
| 2 | 1 |
| 3 | 1 |
| 4 | 1 |
| 5 | 1 |
| 6 | 1 |
| 7 | 1 |
| 8 | 1 |
| 9 | 1 |
| 10 | 2 |
| 11 | 2 |
| 12 | 2 |
| 13 | 3 |
| 14 | 3 |
| 15 | 3 |

The subgrouping module 114 is configured to subgroup the one or more created groups of test cases. In an embodiment of the present invention, the subgrouping module is capable of identifying groups containing large number of test cases. Further, the subgrouping module 114 identifies one or more groups that contain test cases beyond a pre-configured threshold value. In an exemplary embodiment of the present invention, the pre-configured threshold value is 20. On identifying the groups containing test cases beyond the threshold value, the subgrouping module 114 matches the test case descriptions of the one or more test cases within a group and forms subgroup of the test cases that have similar test case description. In an embodiment of the present invention, a subgroup is formed if the test case description of two or more test cases match by at least a preconfigured percentage. In an exemplary embodiment of the present invention, the preconfigured percentage is 50%.

Once the grouping and subgrouping of test cases is completed, the control is transferred to the naming module 116.

The naming module 116 is configured to assign names to the one or more created groups and subgroups. In an embodiment of the present invention, the naming module 116 considers all the test cases of each of the one or more groups and sub-groups and applies following formula on the description text to assign weightages:

Log(Test case frequency*Term frequency)

wherein the term frequency is number of times a particular term/word occurs in test steps of all test cases and the test case frequency is number of test cases that a particular term/word is occurring. Further, the naming module 116 identifies the top three words with highest weightages. The naming module 116 then identifies predecessor and successor word of all the three words from the description of the test cases and creates three phrases corresponding to the three words having the following pattern: [predecessor, identified word, successor]. The frequency of the three phrases is then calculated. The most frequent pattern is then selected as the name of the corresponding group or subgroup. In case the frequency of two or more phrases is same, then the naming module 116 selects the phrase based on a preconfigured factor such as, but not limited to, maximum length and minimum length.

Figure 2:
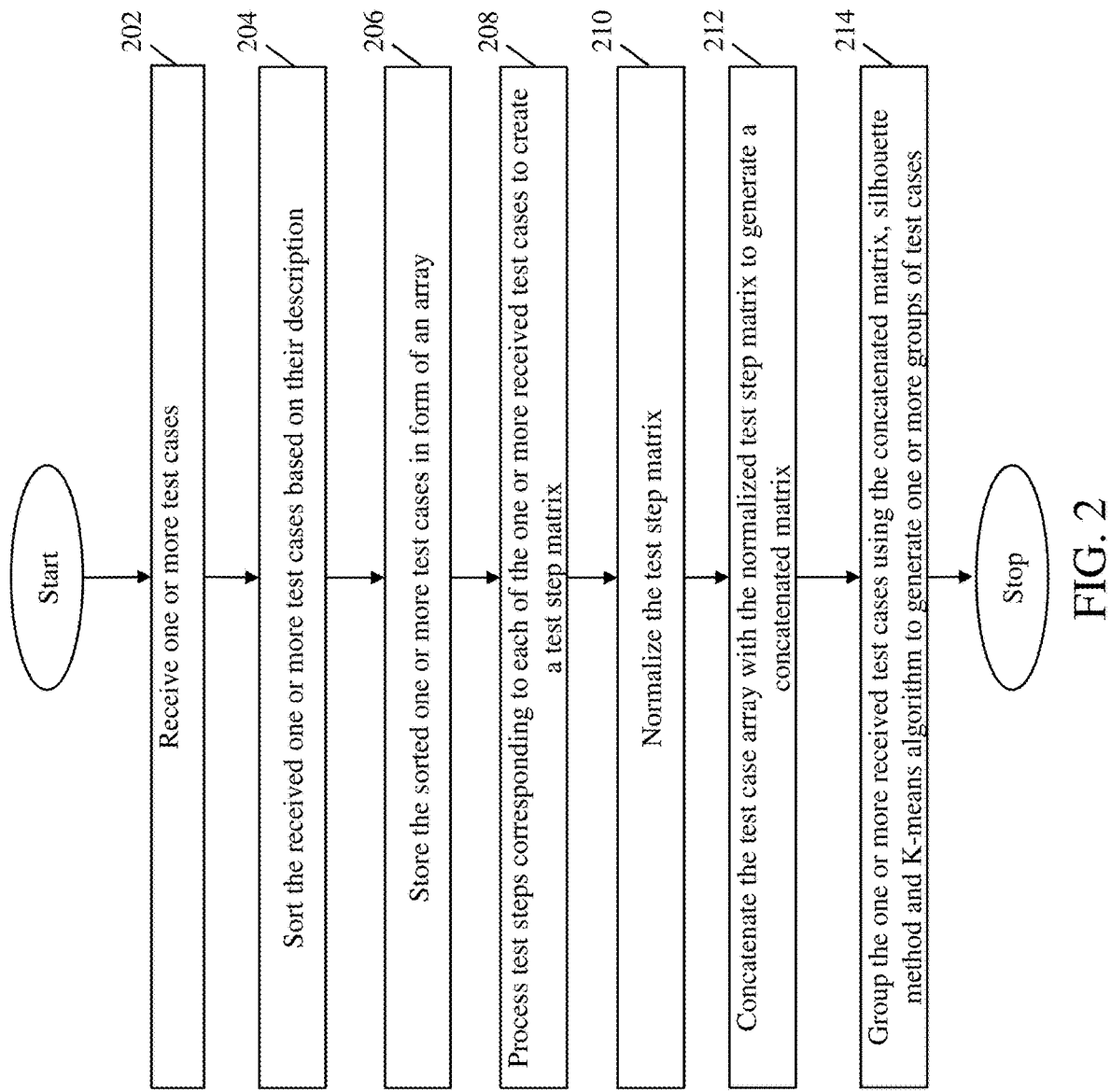
FIG. 2 is a flowchart illustrating a method for automatically categorizing test cases for model based testing, in accordance with an embodiment of the present invention.

FIG. 2 is a flowchart illustrating a method for automatically categorizing test cases for model based testing, in accordance with an embodiment of the present invention.

At step 202, one or more test cases are received. The one or more test cases are received by importing one or more files containing information such as, but not limited to, test case ID, test case description and test step description. The one or more files have various formats such as, but not limited to, spreadsheet format, document format and EXtensible Markup Language (XML) format. In an embodiment of the present invention, the one or more test cases are received from one or more test management systems and one or more test case repositories.

At step 204, the received one or more test cases are sorted based on their description. In an exemplary embodiment of the present invention, the one or more test cases whose description is 70% same are sorted into one group. Furthermore, the sorted groups are then assigned group numbers. In an exemplary embodiment of the present invention, the sorted groups are assigned numbers in ascending order starting from 1.

At step 206, an array connecting each test case with corresponding group number is formed and stored. Further, each group number is divided by the maximum number of groups. The array along with other data is stored in a repository.

At step 208, test steps corresponding to each of the one or more received test cases are processed to create a test step matrix. For creating the test step matrix, weightage of each word in the test step is calculated using the following formula:

$$\log(\text{Term frequency}) * \log\left(\frac{\text{Total Number of test cases}}{\text{Test case Frequency}}\right)$$

wherein, term frequency is number of times a particular term/word occurs in test steps of all test cases and test case frequency is number of test cases that a particular term/word is occurring. Further, threshold weightage is calculated using the following formula:

Threshold=Mean+Standard deviation (weightages)

In case any test case is not represented, for example in a scenario the test case may not be captured by means of selected words or the entire row is zero, then the next word with immediate less than threshold is considered and the word matrix is updated. The above steps are repeated until all the test cases are represented in the test step matrix.

At step 210, the rows of the created test step matrix are normalized. At step 212, the test case array is concatenated with the normalized test step matrix to generate a concatenated matrix.

At step 212, the one or more received test cases are grouped using the concatenated matrix, silhouette method and K-means algorithm to generate one or more groups of test cases belonging to one or more categories.

In an embodiment of the present invention, after the grouping of the one or more test cases, one or more subgroups of the generated one or more groups of test cases are created based on a preconfigured threshold value. In an embodiment of the present invention, groups containing large number of test cases are identified. Further, one or more groups that contain test cases beyond the preconfigured threshold value are then identified. On identifying the one or more groups containing test cases beyond the threshold value, the test case descriptions of the one or more test cases within a group are matched to form one or more subgroups of the test cases that have similar test case description within the group.

In an embodiment of the present invention, once the one or more groups and subgroups are created, names are assigned to the one or more created groups of test cases and the one or more created subgroups. In an embodiment of the present invention, all the test cases of each of the one or more groups and sub-groups are considered and following formula is applied on the description text to assign weightages:

Log(Test case frequency*Term frequency)

wherein the term frequency is number of times a particular term/word occurs in test steps of all test cases and the test case frequency is number of test cases that a particular term/word is occurring. Further, the top three words with highest weightages are identified. Further, predecessor and successor word of all the three words are also identified from the description of the test cases and three phrases corresponding to the three words having the following pattern: [predecessor, identified word, successor] are created. The frequency of the three phrases is then calculated. The most frequent pattern is then selected as the name of the corresponding group or subgroup. In case the frequency of two or more phrases is same, then the phrase based on a preconfigured factor such as, but not limited to, maximum length and minimum length is assigned as the name of the group or subgroup.

Figure 2A:
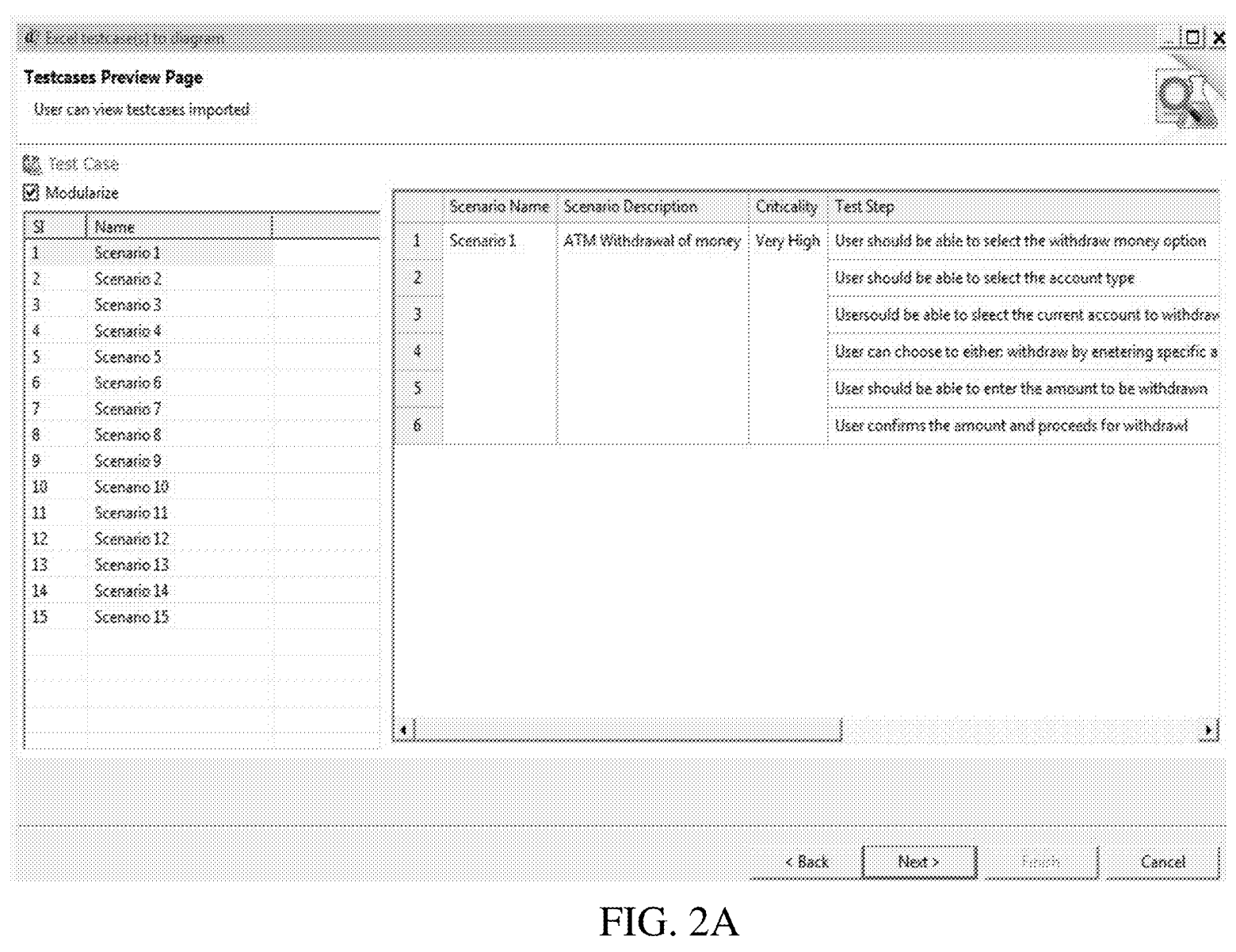

FIG. 2A is a screenshot illustrating importation of test cases, in accordance with an exemplary embodiment of the present invention. As illustrated, fifteen test cases referred to as "Scenario" are received/imported from a Microsoft Excel file. Further, each of the received test case include information such as, but not limited to, scenario name, scenario description, criticality and test step. The information corresponding to each of the received test case is used for categorizing/modularizing the test cases into one or more groups.

Figure 2B:
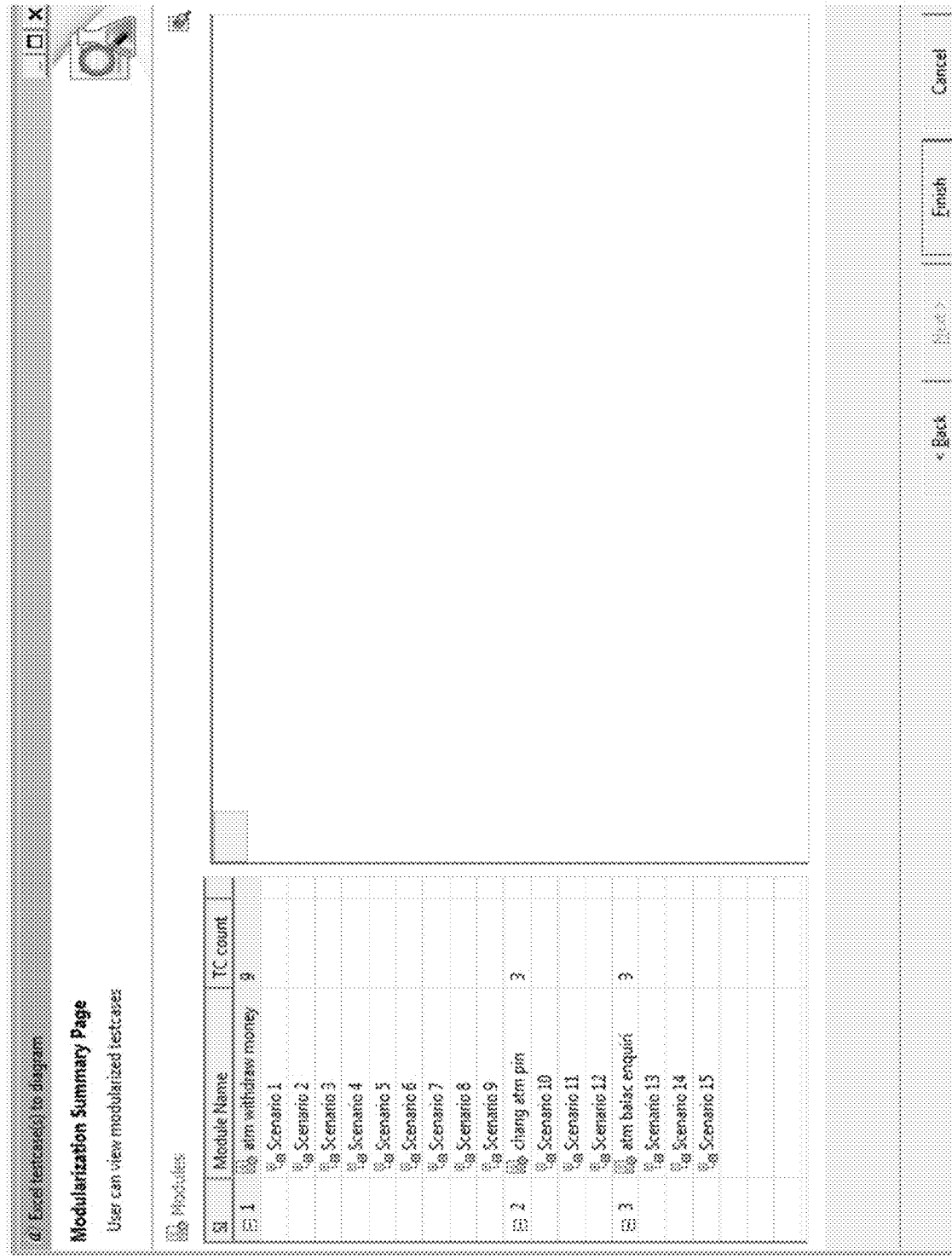
FIG. 2B is a screenshot illustrating categorized test cases, in accordance with an exemplary embodiment of the present invention.

FIG. 2B is a screenshot illustrating categorized test cases, in accordance with an exemplary embodiment of the present invention. As illustrated, the fifteen ATM test cases are categorized into three groups "atm withdraw money", "change atm pin" and "atm balance enquiry". Further, "atm withdraw money" group comprises of nine test cases, "change atm pin" group comprises of three test cases and "atm balance enquiry" group comprises of three test cases.

Figure 3:
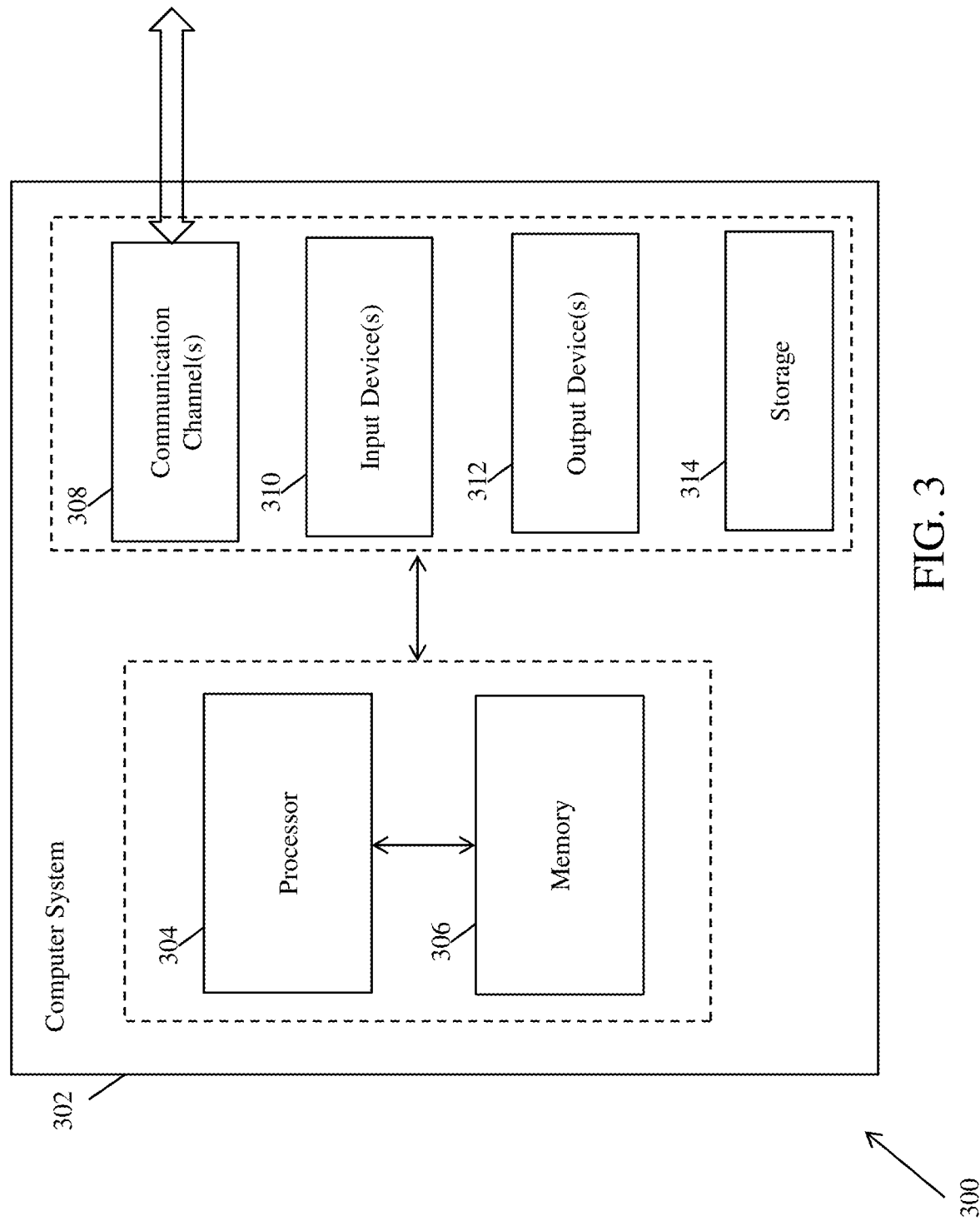
FIG. 3 illustrates an exemplary computer system for automatically categorizing test cases for model based testing, in accordance with an embodiment of the present invention.

FIG. 3 illustrates an exemplary computer system for automatically categorizing test cases for model based testing, in accordance with an embodiment of the present invention The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer-implemented method for automatically categorizing test cases, via program instructions stored in a memory and executed by a processor, the computer-implemented method comprising:
   receiving and sorting one or more test cases based on description of the one or more test cases into one or more groups and forming a test case array connecting each of the one or more test cases with a corresponding group number;
   analyzing test steps corresponding to each of the one or more received test cases to create a test step matrix;
   concatenating the test case array with the test step matrix to generate a concatenated matrix;
   grouping the one or more received test cases by using the concatenated matrix and applying silhouette method and K-means algorithm to generate one or more groups of test cases belonging to one or more categories; and
   creating one or more subgroups of the generated one or more groups of test cases based on a preconfigured threshold value.

2. The computer-implemented method of claim 1, wherein the one or more test cases are received from one or more test management systems and one or more test case repositories.

3. The computer-implemented method of claim 1, wherein the one or more test cases are received by importing one or more files containing information comprising test case identification number, test case description and test step description.

4. The computer-implemented method of claim 3, wherein the one or more files have one or more formats comprising a spreadsheet format, a document format and an EXtensible Markup Language (XML) format.

5. The computer-implemented method of claim 1 further comprising a step of assigning names to the one or more generated groups of test cases and the one or more created subgroups.

6. A system for automatically categorizing test cases, the system comprising:
   a memory storing programming instructions;
   a processor executing programming instructions stored in the memory;
   a test case importing module executed by the processor and configured to receive one or more test cases;
   a primary grouping module executed by the processor and configured to sort the one or more received test cases based on description of the one or more test cases into one or more groups and form a test case array connecting each of the one or more received test cases with a corresponding group number;
   a test step matrix generator executed by the processor and in communication with the test case importing module configured to:
   receive the one or more test cases; and
   analyze test steps corresponding to each of the one or more received test cases to create a test step matrix;
   a matrix concatenator executed by the processor and configured to concatenate the test case array with the test step matrix to generate a concatenated matrix;
   a secondary grouping module executed by the processor and configured to group the one or more received test cases by using the concatenated matrix and applying silhouette method and K-means algorithm to generate one or more groups of test cases belonging to one or more categories; and
   a subgrouping module executed by the processor and configured to create one or more subgroups of the generated one or more groups of test cases based on a preconfigured threshold value.

7. The system of claim 6, wherein the one or more test cases are received from one or more test management systems and one or more test case repositories.

8. The system of claim 6, wherein the one or more test cases are received by importing one or more files containing information comprising test case identification number, test case description and test step description.

9. The system of claim 8, wherein the one or more files have one or more formats comprising a spreadsheet format, a document format and an EXtensible Markup Language (XML) format.

10. The system of claim 6 further comprising a naming module configured to assign names to the one or more generated groups of test cases and the one or more created subgroups.

11. A computer program product for automatically categorizing test cases, the computer program product comprising:
   a non-transitory computer-readable medium having computer-readable program code stored thereon, the computer-readable program code comprising instructions that when executed by a processor, cause the processor to:
   receive and sort one or more test cases based on description of the one or more test cases into one or more groups and forming a test case array connecting each of the one or more test cases with a corresponding group number;

analyze test steps corresponding to each of the one or more received test cases to create a test step matrix;
concatenate the test case array with the test step matrix to generate a concatenated matrix;
group the one or more received test cases by using the concatenated matrix and applying silhouette method and K-means algorithm to generate one or more groups of test cases belonging to one or more categories; and
create one or more subgroups of the generated one or more groups of test cases based on a preconfigured threshold value.

* * * * *